United States Patent
Kleider et al.

(10) Patent No.: US 7,672,381 B1
(45) Date of Patent: Mar. 2, 2010

(54) METHOD OF MULTIPLE-CARRIER COMMUNICATION WITHIN A NONCONTIGUOUS WIDEBAND SPECTRUM AND APPARATUS THEREFOR

(75) Inventors: John Eric Kleider, Scottsdale, AZ (US); Bruce Alan Fette, Mesa, AZ (US); Jeffrey Scott Chuprun, Scottsdale, AZ (US); Carl Steven Gifford, Gilbert, AZ (US); Chad S. Bergstrom, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 2188 days.

(21) Appl. No.: 09/690,993

(22) Filed: Oct. 17, 2000

(51) Int. Cl.
*H04K 1/10* (2006.01)
*H04L 27/28* (2006.01)

(52) U.S. Cl. .................. 375/260; 375/222; 375/267; 375/286; 375/316

(58) Field of Classification Search .............. 375/260, 375/227, 286, 287, 222, 261, 316, 267; 702/191; 370/208, 356, 480
See application file for complete search history.

(56) References Cited

U.S. PATENT DOCUMENTS

| | | | | |
|---|---|---|---|---|
| 4,679,227 | A | * | 7/1987 | Hughes-Hartogs ....... 379/93.31 |
| 5,521,906 | A | | 5/1996 | Grube et al. |
| 5,748,677 | A | * | 5/1998 | Kumar ..................... 375/285 |
| 5,822,374 | A | | 10/1998 | Levin |
| 5,956,642 | A | | 9/1999 | Larsson et al. ............ 455/449 |
| 6,005,893 | A | * | 12/1999 | Hyll ........................ 375/260 |
| 6,035,000 | A | * | 3/2000 | Bingham ................. 375/296 |
| 6,134,273 | A | * | 10/2000 | Wu et al. .................. 375/261 |
| 6,205,410 | B1 | * | 3/2001 | Cai .......................... 702/191 |
| 6,363,109 | B1 | * | 3/2002 | Polley et al. ............. 375/222 |
| 6,467,092 | B1 | * | 10/2002 | Geile et al. .............. 725/131 |
| 6,516,027 | B1 | * | 2/2003 | Kapoor et al. ........... 375/227 |

FOREIGN PATENT DOCUMENTS

EP 0 753 948 A1 1/1997

(Continued)

OTHER PUBLICATIONS

An article entitled "A Distributed Power Allocation Algorithm With Adaptive Modulation For Multi-Cell OFDM Systems", by Hsuan-Jung Su and Evaggelos Geraniotis from IEEE 1998.

(Continued)

*Primary Examiner*—Ted M Wang
(74) *Attorney, Agent, or Firm*—Lawrence J. Chapa (57) ABSTRACT

A method (20) of orthogonal frequency-division multiplex (OFDM) communication via a plurality of subchannels (30) within a noncontiguous wideband channel (24) is provided. The method (20) determines an SNR for each of the subchannels (30). The method (20) then designates a subchannel (30) as clear (93) when its SNR is greater than a least-SNR threshold (70), as impeded (95) when its SNR is less than the least-SNR threshold and greater than an SNR-evaluation threshold, and as obstructed (111) when its SNR is less than both the least-SNR and the SNR-evaluation thresholds. The method (20) then transmits OFDM data (34) so that each of the clear subchannels receives the OFDM data (34) at a maximum subchannel signal level (40), each of the impeded subchannels receives the OFDM data (34) at an intermediate subchannel signal level (42), and each of the obstructed subchannels receives the OFDM data (34) at zero subchannel signal level (44).

28 Claims, 6 Drawing Sheets

FOREIGN PATENT DOCUMENTS

GB  2 187 611 A  9/1987
WO  WO 01/80510 A1  10/2001

OTHER PUBLICATIONS

An article entitled "A Practical Discrete Multitone Transceiver Loading Algorithm For Data Transmission Over Spectrally Shaped Channels", by Peter S. Chow, John M. Cioffi and John A.C. Bingham, from IEEE Transactions on Communications, vol. 43, No. 2/3/4/, Feb./Mar./Apr. 1995.

An article entitled "Trellis Precoding: Combined Coding, Precoding and Shaping for Intersymbol Interference Channels", by M. Vedat Eyuboglu, and G. David Forney, Jr., from 1992 IEEE.

An article entitled "Combined Equalization and Coding Using Precoding", by G. David Forney and M. Vedat Eyuboglu, from 1991, IEEE.

An article entitled "The Multitone Channel" by Irving Kalet from 1989 IEEE.

An article entitled A Discrete Multitone Transceiver System For HDSL Applications by Jacky S. Chow, Jerry C. Tu and John M. Cioffi, from 1991 IEEE.

An article entitled "Optimization Of Discrete Multitone To Maintain Spectrum Compatibility With Other Transmission Systems On Twisted Copper Pairs", by Melbourne Barton and Michael L. Honig from 1995 IEEE.

An article entitled "Variable-Rate Variable-Power MQAM for Fading Channels" by Andrea J. Goldsmith and Soon-Ghee Chua, from 1997 IEEE.

Kiyoshi Hamaguchi and Elimatsu Moriyama, "Performance of Multicarrier/QAM-Level-Controlled Adaptive Modulation for Land Mobile Communication Systems", IEICE Trans. Commun. vol. E81-B No. 4, Apr. 1998, 6 pages.

ANSI; "Network and Customer Installation Interfaces—Asymmetric Digital Subscriber Line (ADSL) Metallic Interface"; T1.413-1995; pp. 94, 98, and 101.

ANSI; "Network and Customer Installation Interfaces—Asymmetric Digital Subscriber Line (ADSL) Metallic Interface"; T1.413-1998 Revision of ANSI 11.413-1995; pp. 102-103, 106 and 110.

* cited by examiner

METHOD OF MULTIPLE-CARRIER COMMUNICATION WITHIN A NONCONTIGUOUS WIDEBAND SPECTRUM AND APPARATUS THEREFOR

TECHNICAL FIELD OF THE INVENTION

The present invention relates to the field of radio-frequency communication. More specifically, the present invention relates to the field of multiple carrier communication via a portion of subchannels available within a spectrum of a wideband radio-frequency channel.

BACKGROUND OF THE INVENTION

In general, communication systems utilizing wideband communication techniques convey large amounts of data via a single communication link over a wideband channel. Single-carrier wideband communication techniques typically exhibit marked signal deterioration proximate the limits of the wideband channel relative to the center (carrier) frequency. This is due in a large part to the difficulty of producing a substantially flat response over the entirety of the wideband channel bandwidth.

Multiple-carrier (multi-carrier) wideband communication techniques divide the wideband channel into multiple subchannels. Each subchannel has a signal (i.e., a modulated carrier) having a relatively narrow bandwidth. This relatively narrow bandwidth allows each subchannel to have a substantially flat frequency response. Through normalization and other techniques, these substantially flat response subchannels are concatenated to produce a substantially flat frequency response over the wideband channel. This technique is also known as multiple-tone (multitone) communication.

Efficient implementations of multi-carrier communication systems (e.g., those sampled at the Nyquist rate) allow the sub-carrier frequency response to overlap. The overlapped sub-carrier frequencies are typically required to be orthogonal. Systems utilizing such orthogonal multi-carrier techniques are often referred to as orthogonal frequency-division multiplexing (OFDM) systems.

OFDM communication techniques provide improved performance over other wideband communication techniques. Utilizing an OFDM communication technique, a wideband communication system utilizes a wideband channel frequency-multiplexed into a plurality of narrowband subchannels. Since each subchannel is not in itself wideband, circuitry may readily be devised that produces a substantially flat response over each subchannel bandwidth.

An OFDM communication technique is a discrete multi-tone (DMT) modulation technique by which optimized algorithms may be utilized to appropriately allocate energy and bits to each of the plurality of subchannels. This allows reliable data transfers at high rates.

OFDM techniques desirably utilize a contiguous set of subchannels, thereby providing an easily implemented wideband channel. This is typical of wireline (i.e., hard-wired) communications systems. DMT modulation has been successfully implemented for asynchronous digital subscriber line (ADSL) communications providing improved high-speed data transfers over ordinary twisted-pair lines.

Problems arise when there are breaks in the spectrum of the wideband channel, i.e., when all usable subchannels are not contiguous, as is often the case with wireless communication systems. This may occur when some subchannels contain excessive noise or other interference, or are disallowed for any reason. Several techniques have been developed to compensate for such noncontiguous spectra. Conventionally, such techniques tend to involve the use of a static assignment or non-assignment of each subchannel. That is, the OFDM signal simply does not use a contested subchannel. Static subchannels presume a static wideband channel and therefore represents a considerable inefficiency.

In wireless OFDM communication, the RF spectrum of the wideband channel is often dynamic. For example, a dynamic spectrum may be found where an OFDM communication system shares a portion of the spectrum with one or more "foreign" systems (e.g., any RF system other than the OFDM system itself). In this case, subchannels need to be dynamically assigned on a non-interference basis. This may be done in the OFDM system, in the foreign system, or both.

Dynamic spectra are often encountered with mobile communication systems. The very movements of components of the system produce ever-changing transmission paths. Such dynamic transmission paths are therefore subject to variant shadowing, noise, and interference. Even when the communication system is a fixed point-to-point system, atmospheric conditions, external mobile entities (aircraft, motor vehicles, etc.), and local noise sources (construction equipment, factories, other communication systems, etc.) may result in a dynamic spectrum.

In an OFDM communication system utilizing a wideband channel having a dynamic spectrum (i.e., a dynamic wideband channel), all or a portion of the subchannels are dynamic. That is, individual subchannels may be subject to variations in noise, interference, and transmissibility over both time and frequency. Any such dynamic subchannel may be theoretically usable, partially usable, or unusable at any given time.

Several techniques have been developed to compensate for dynamic spectra. One such technique typically incorporates scanning the wideband channel and providing transmission over only those subchannels that are clear, i.e., are fully usable. That is, that technique uses a scheme to provide selective assignment or non-assignment of each subchannel, rejecting any subchannel having more than a minimum threshold of noise, interference, and/or transmissibility. This, too, represents a considerable inefficiency.

Such a selective-assignment technique may itself be dynamic. That is, data may be transmitted in packets, with the selective-assignment scheme scanning the wideband channel and selectively re-assigning subchannels for each packet. Such a dynamic-selective assignment technique provides a marked improvement over a static selective-assignment technique, but still exhibits a pronounced inefficiency.

An OFDM communication technique is therefore needed that provides sufficient quality of service (QoS) with a high data throughput over a dynamic wideband channel. Such a technique should optimize efficiency by utilizing each subchannel within the wideband channel to its fullest.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENTS

Figure 1:
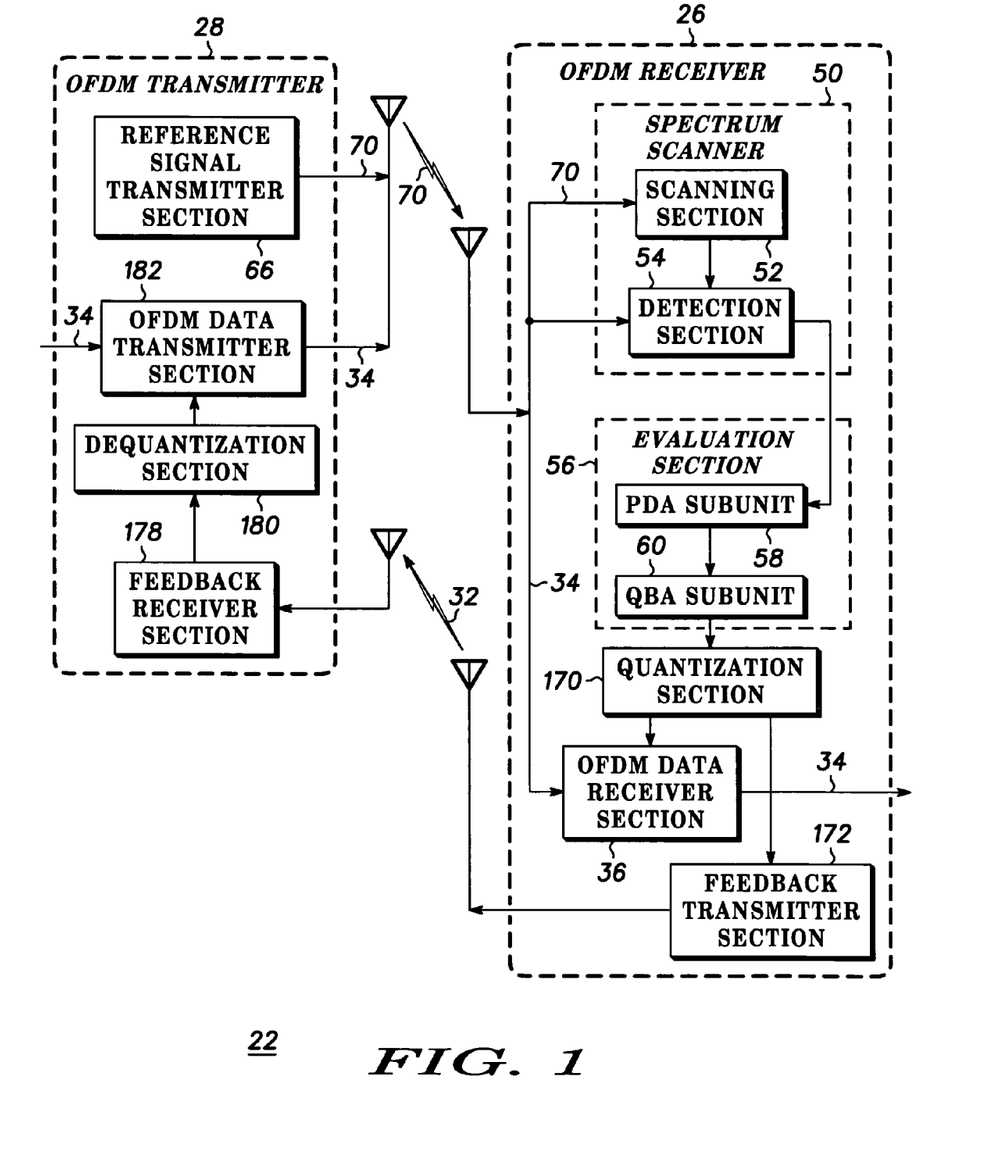
FIG. 1 shows a block diagram depicting an orthogonal frequency-division multiplex (OFDM) communication system in accordance with a preferred embodiment of the present invention.
Figure 2:
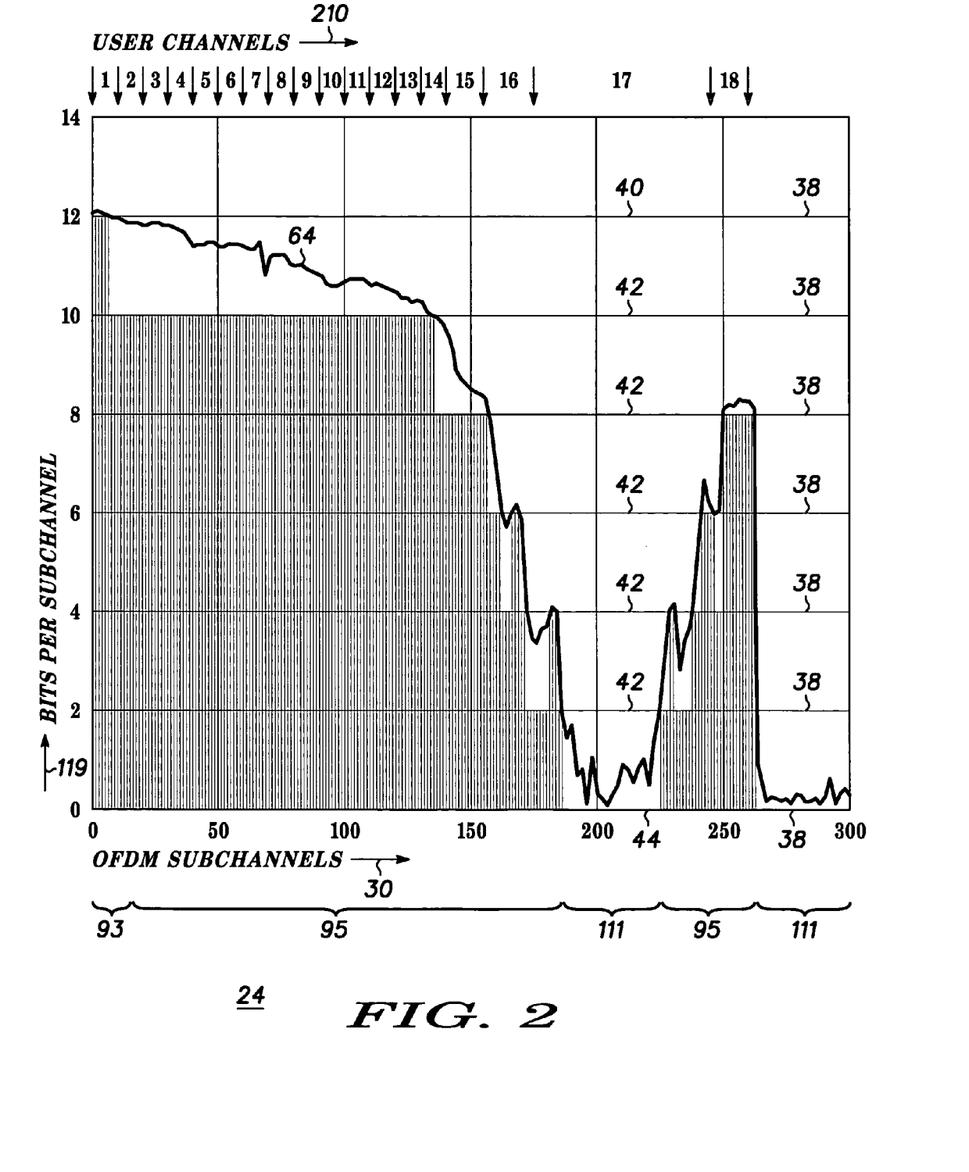
FIG. 2 shows a chart depicting usage of a wideband channel by the OFDM communication system of FIG. 1 in accordance with a preferred embodiment of the present invention.

FIG. 1 shows a block diagram depicting OFDM communication system 22 and FIG. 2 shows a chart depicting usage of wideband channel 24 by OFDM communication system 22 in accordance with a preferred embodiment of the present invention. The following discussion refers to FIGS. 1 and 2.

OFDM communication system 22 is made up of an OFDM receiver 26 and an OFDM transmitter 28 in communication with each other over a plurality of subchannels 30 within wideband channel 24. OFDM receiver 26 produces a modulation profile (not shown) of subchannels 30, and transmits the modulation profile to OFDM transmitter 28 over a feedback channel 32. OFDM transmitter 28 then transmits OFDM data 34 to OFDM receiver 26 in response to the modulation profile. OFDM receiver 26 receives and decodes OFDM data 34 in an OFDM data receiver section 36. OFDM data 34 in each subchannel 30 is received at one of a plurality of signal levels 38, being a maximum subchannel signal level 40, at least one intermediate subchannel signal level 42, and a zero subchannel signal level 44. In the preferred embodiment of FIG. 2, an eight-level scheme is incorporated. For this eight-level scheme, multiple combinations of bit-to-symbol mappings are possible. For example, if 1 to 8 bits per symbol are desired with increments of 1 bit, then a modulation constellation set with modulation orders in the set {2, 4, 8, 16, 32, 64, 128, 256} would be required. If we use only even bit-to-symbol mappings from 2 to 16 bits, then a modulation constellation set with modulation orders in the set {4, 16, 64, 256, 1024, 4096, 16384, 65536} would be required.

Figure 3:
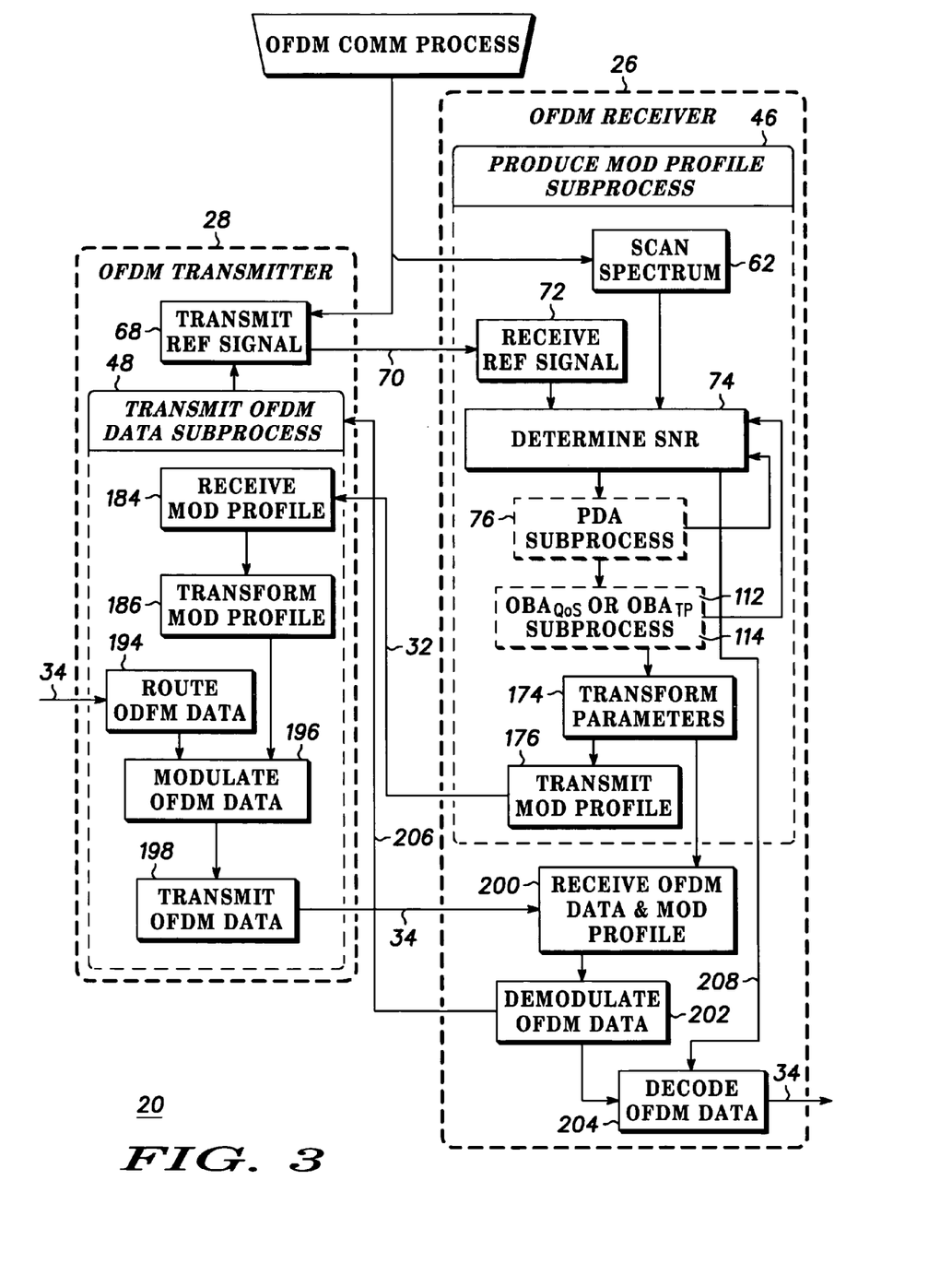
FIG. 3 shows a block diagram depicting an OFDM communication process for the system of FIG. 1 in accordance with a preferred embodiment of the present invention.

FIG. 3 shows a block diagram depicting OFDM communication process 20 in accordance with a preferred embodiment of the present invention. The following discussion refers to FIGS. 1, 2, and 3.

OFDM communication system 22 (FIG. 1) utilizes process 20 (FIG. 3) to fulfill its functions. A subprocess 46 is executed within OFDM receiver 26 to produce the modulation (MOD) profile. The modulation profile is produced in response to a signal-to-noise ratio (SNR) of each subchannel 30 obtained as a part of subprocess 46. A subprocess 48 is then executed within OFDM transmitter 28 to transmit OFDM data 34 for each subchannel 30 in response to this modulation profile (i.e., in response to the SNR of each subchannel 30). OFDM data 34 is transmitted so that OFDM data 34 is received at OFDM receiver 26 at one of maximum subchannel signal level 40, an intermediate subchannel signal level 42, or zero subchannel signal level 44.

OFDM receiver 26 (FIG. 1) contains a spectrum scanner 50 consisting of a scanning section 52 and a detection section 54 coupled to scanning section 52. OFDM receiver 26 also contains an evaluation section 56 coupled to detection section 54 and containing a power distribution algorithm (PDA) subunit 58 and an optimal bit-loading algorithm (OBA) subunit 60.

Within scanning section 52, a task 62 of subprocess 46 scans wideband channel 24 to determine a noise level 64 (FIG. 2) therefor, i.e., for each subchannel 30 in the plurality of subchannels 30 within wideband channel 24. Noise level 64 of any given subchannel 30 is substantially the amount of energy in that subchannel 30 representing all the noise therein. Those skilled in the art will appreciate that "noise," in the context of this document, means any interference, random noise, foreign signal, reflected signal, multipath signal, or other content of subchannel 30 received at or generated by OFDM receiver 26 and not the strongest signal transmitted by OFDM transmitter 28. Noise level 64 is therefore the level of any energy in the subchannel 30 not provided by OFDM transmitter 28.

OFDM transmitter 28 contains a reference transmitter 66 (FIG. 1). In a task 68, reference transmitter 66 transmits a reference signal 70 to spectrum scanner 50 and scanning and detection sections 52 and 54 therein. Within spectrum scanner 50, a task 72 (FIG. 3) receives reference signal 70, and a task 74 determines the SNR for each subchannel 30 in the plurality of subchannels 30 within wideband channel 24 in response to noise levels 64 and reference signal 70.

The SNR for each subchannel 30 can be determined by any appropriate technique known to those skilled in the art. For example, in the preferred embodiment in which OFDM transmitter 28 contains reference transmitter 66, task 74 determines the SNR for each subchannel 30 by dividing the signal power of that subchannel 30 by the equivalent noise power at the sub-carrier frequency of that subchannel 30. The noise power will vary among subchannels 30 and over time. The preferred embodiment therefore measures the noise power of each subchannel 30 immediately prior to transmission of OFDM data 34.

Reference signal 70 is used to aid in optimal reception by providing known amplitude and phase information at known frequencies. Reference signal 70 aids in the resolution of time and frequency offsets between OFDM transmitter 28 and OFDM receiver 26.

In an alternative embodiment, wherein OFDM transmitter 28 does not produce reference signal 70, OFDM receiver 26 may accumulate noise data present at its input. OFDM receiver 26 may then perform a fast Fourier transform (FFT) of the accumulated noise data to determine the estimated noise levels in each subchannel 30 (i.e., at each sub-carrier frequency). Multiple FFT blocks of noise data may be averaged to refine the estimated noise levels.

A similar process may be performed when OFDM transmitter 28 is transmitting OFDM data 34. OFDM receiver 26 may estimate the SNR of each subchannel 30 by subtracting, at each sub-carrier frequency, the signal-plus-noise estimate from the noise estimate to find the signal level estimate. The SNR for each subchannel 30 may then be determined by dividing the estimated signal power by the estimated noise power. Each independent subchannel 30 is equivalent to an additive white Gaussian (AWGN) subchannel, wherein the SNR is substantially a received signal power E multiplied by a subchannel gain-to-noise ratio G: SNR=E·G. Gain-to-noise ratio G includes any random noise, foreign signal, reflected signal, or other content of a given subchannel 30 received at or generated by OFDM receiver 26 that is not a part of OFDM data 34 transmitted to OFDM receiver 26 over that subchannel 30 by OFDM transmitter 28.

A rate b (bits/subchannel) is a measure of the subchannel throughput. Rate b is calculated from $b=\log_2[(1+SNR)/G]$. An SNR gap, $\Gamma$, is derived from the SNR and rate b as $\Gamma=SNR/(2^b-1)$. SNR gap $\Gamma$ measures the SNR distance from a capacity C, where $C=\log_2(1+SNR)$.

For uncoded modulations (i.e., those with no error correcting code), SNR gap $\Gamma$ is directly related to the bit error performance of the modulation. For example, SNR gap $\Gamma$ is approximately 9.0 dB for an uncoded QAM signal whose bit error rate (BER) is substantially $10^{-6}$. This is readily estimated from a universal BER curve (an Eyuboglu/Forney curve) well known to those skilled in the art. For an uncoded M×M square QAM signal set, where M is the number of bits per modulation symbol, the symbol error rate (SER) is substantially $SER \cong 4Q \cdot (3\Gamma)^{1/2}$. The SER is substantially derived from the BER. For example, for a gray encoded bit-to-symbol mapping such that, under acceptable conditions, there is only approximately one bit error for each symbol error, the SER is substantially $SER \cong BER \cdot \log_2(M^2)$. Either the SER or the BER (or both) may be used to set the quality of service (QoS) threshold requirements for the system.

Those skilled in the art will appreciate that, since "noise," in the context of this document, means any random noise, foreign signal, reflected signal, multipath signal, or other content of a subchannel 30 received at or generated by OFDM receiver 26 that is not a part of the OFDM data 34 in the strongest signal transmitted to OFDM receiver 26 over that subchannel 30 by OFDM transmitter 28, the signal-to-noise ratio (SNR), for the purposes of discussion, can also be viewed as a signal-to-noise-plus-interference ratio (SNIR).

Figure 4:
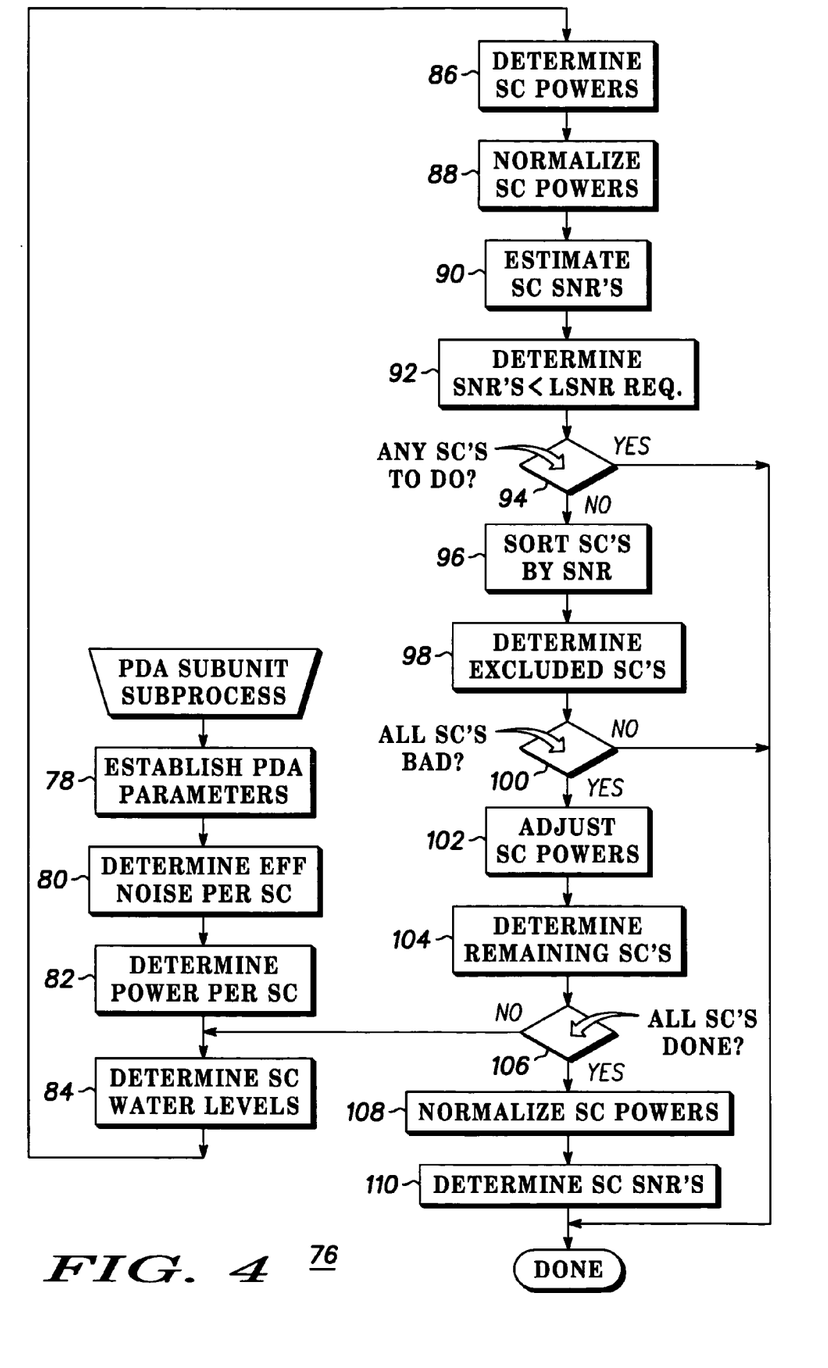
FIG. 4 shows a block diagram depicting a power-distribution-algorithm subprocess of the OFDM communication process of FIG. 2 in accordance with a preferred embodiment of the present invention.

FIG. 4 shows a block diagram depicting a PDA subprocess 76 of OFDM communication process 20 in accordance with a preferred embodiment of the present invention. The following discussion refers to FIGS. 1 through 4.

In the preferred embodiment depicted in FIG. 4, subprocess 76 (FIG. 4) is that portion of process 20 (FIG. 3) executed within PDA subunit 58 (FIG. 1). Within subprocess 76, a task 78 establishes initial parameters for the power distribution algorithm (PDA). These initial parameters may include: N, a total number of subchannels 30 in wideband channel 24; i, any given subchannel 30 from 1 to N; $g_i$, a subchannel gain; $pn_i$, a subchannel noise power; $\Gamma_i$, a transmission SNR gap; ng, a number of subchannels 30 in the transmission group; pt, a total power transmitted by OFDM transmitter 28 that is received at OFDM receiver 26; $\mu$, an algorithmic convergence factor; and $\zeta_i$, a subchannel least-SNR requirement. Those skilled in the art will appreciate that, since "noise" is taken herein as "interference plus noise," $pn_i$ should be taken as subchannel "interference-plus-noise power."

A task 80 determines an effective (EFF) noise power epn for each subchannel (SC) 30. Effective noise power epn is substantially SNR gap $\Gamma$ multiplied by subchannel noise power pn and divided by subchannel gain g, i.e., $epn_i = \Gamma_i \cdot pn_i / g_i$.

A task 82 then determines an initial power P for each subchannel 30. Initial power P is simply total received power pt divided by number of subchannels ng, i.e., $P_i = pt/ng$.

Subprocess 76 then enters a PDA processing loop. A task 84 determines a "water level" W for each non-invalid subchannel 30. Initially, all subchannels 30 are non-invalid, i.e., number of subchannels left ncl is equal to number of subchannels ng. With each iteration of the PDA loop, however, one or more subchannels 30 may be classed as invalid, decreasing number of subchannels left ncl. Water level W is substantially a sum of a summation of subchannel powers P of all subchannels 30 plus a summation of all effective noise powers epn of all valid subchannels 30, with the sum divided by number of remaining subchannels ncl, i.e., $W=(\Sigma P_{1:N} + \Sigma epn_{1:ng})/ncl$. Hence, water level W represents an equalized power level.

A task 86 then determines subchannel power P for each valid subchannel 30. Subchannel power P is substantially a difference of water level W less effective noise power epn, i.e., $P_{1:ng} = W - epn_{1:ng}$.

A task 88 then normalizes subchannel powers P. This is effected by determining subchannel power P for each "good" subchannel 30 (i.e., a subchannel 30 in which effective noise power epn is below water level W) as substantially equal to total received power pt divided by the number of "good" subchannels 30, i.e., $P_{good} = pt/_{good}$.

Conversely, task 88 establishes subchannel power P for each "bad" subchannel 30 (i.e., a subchannel 30 in which effective noise power epn is above or equal to water level W) as zero, i.e., $P_{bad}=0$.

Those skilled in the art will appreciate that, under some conditions, normalization task 88 may be considered optional. The exclusion of task 88 does not depart from the spirit of the present invention.

The SNR of each subchannel 30 is then estimated by a task 90 as subchannel power P divided by effective noise power, i.e., $SNR_i = P_i/epn_i$. Those skilled in the art will appreciate that if P=0 for a given subchannel 30, the SNR for that subchannel 30 is set to a value near zero (e.g., $10^{-5}$).

A task 92 then determines in which ones of subchannels 30 the SNR is less than least-SNR (LSNR) requirement $\zeta$; i.e., $SNR_i < \zeta_i$. Task 92 designates each of subchannels 30 as a clear subchannel 93 on a first iteration of the PDA loop, and as an impeded subchannel 95 on subsequent iterations of the PDA loop.

A query task 94 then determines if there are any subchannels 30 to process. If the SNR of each subchannel 30 was greater than or equal to least-SNR requirement $\zeta$, i.e., $SNR_i \geq \zeta$, then there are no valid subchannels 30. In this case, PDA subprocess 76 is complete.

If at least one subchannel 30 was found whose SNR was less than its least-SNR requirement $\zeta$, a task 96 sorts subchannels 30 by the value of their SNRs.

A task 98 then determines which subchannels 30 are to be excluded from transmission of OFDM data 34 by OFDM transmitter 28. This is effected by first determining the number of invalid subchannels 30, then determining the number of subchannels 30 to reallocate, i.e., $reallocate = fix(_{invalid}/\mu)$. The number of subchannels 30 to be excluded from transmission is the difference between the number of invalid subchannels and the number of reallocatable subchannels, i.e., $_{exclude} = _{invalid} - _{reallocate}$.

Algorithmic conversion factor $\mu$ is empirically derived based upon the characteristics of system 22. In the preferred embodiment, a value of two for factor $\mu$ has proven to be effective. The use of other values for factor $\mu$ does not depart from the spirit of the present invention.

A query task 100 determines if there are any valid subchannels remaining. If there are no valid subchannels 30 remaining, wideband channel 24 is bad. PDA subprocess 76 is terminated and another wideband channel 24 is required.

If there is at least one valid subchannel 30 remaining, a task 102 adjusts subchannel power P of all subchannels 30. This is effected by normalizing subchannel power P of valid subchannels 30 and zeroing subchannel power P in all invalid (removed) subchannels 30.

A task 104 then determines which of subchannels 30 are remaining, i.e., are valid. Under some conditions, task 104 may be accomplished in the negative. That is task 104 may determine which subchannels 30 are removed, i.e., are invalid.

A query task 106 then determines if all subchannels 30 have been optimally processed. This may be ascertained by determining if the number of remaining (valid) subchannels 30 has changed during the last iteration of the PDA loop. If query task 106 determines that there has been a change in the number of valid subchannels 30 during the last iteration, PDA subprocess 76 loops back to task 84.

If query task 106 determines that there has been no change in the number of valid subchannels 30 during the last iteration, then a task 108 normalizes subchannel powers P so that power is substantially flat. As before, this is effected by determining subchannel power P for each valid subchannel 30 as substantially equal to total received power pt divided by the number of valid subchannels 30, i.e., $P_{valid}=pt/_{valid}$, with subchannel power P for each invalid subchannel 30 as zero, i.e., $P_{invalid}=0$.

A task 110 then determines the SNR for each valid subchannel 30 in the normal manner, i.e., $SNR_{valid}=P_{valid}/epn_{valid}$. For invalid subchannels 30, SNR is made close to zero, e.g., $10^{-5}$. PDA subprocess 76 is now complete, and any subchannel 30 not designated as either clear subchannel 93 or impeded subchannel 95 is designated as an obstructed subchannel 111.

In the preferred embodiment, PDA subprocess 76 is based on water filling algorithms with fast convergence properties. In other words, the use of each subchannel 30 is determined according to its likelihood of information carrying potential. Power P may be redistributed to the most likely subchannels 30 according to a ratio of most likely to least likely SNR values below least-SNR requirement Γ. Alternatively, power P may be redistributed to the most likely subchannels 30 according to ratio of total bad temporary subchannels 30 (i.e., below least-SNR requirement Γ) to the number of most likely subchannels 30 capable of carrying information. Power P allocated to each subchannel is proportional to SNR gap Γ times the noise as measured by the spectrum scanner 50. Equivalently, power P is allocated to each subchannel according to SNR gap Γ divided by a subchannel gain-to-noise ratio G. The corresponding rates b are calculated according to minimum QoS and/or throughput requirements of the system using the OBA subunit 60.

Those skilled in the art will appreciate that the description hereinbefore of PDA subprocess 76 pertains to a preferred embodiment of the present invention. The use of variant methods of determining valid and invalid subchannels 30 and of determining the SNR of valid subchannels 30 does not depart from the spirit of the present invention.

Figure 5:
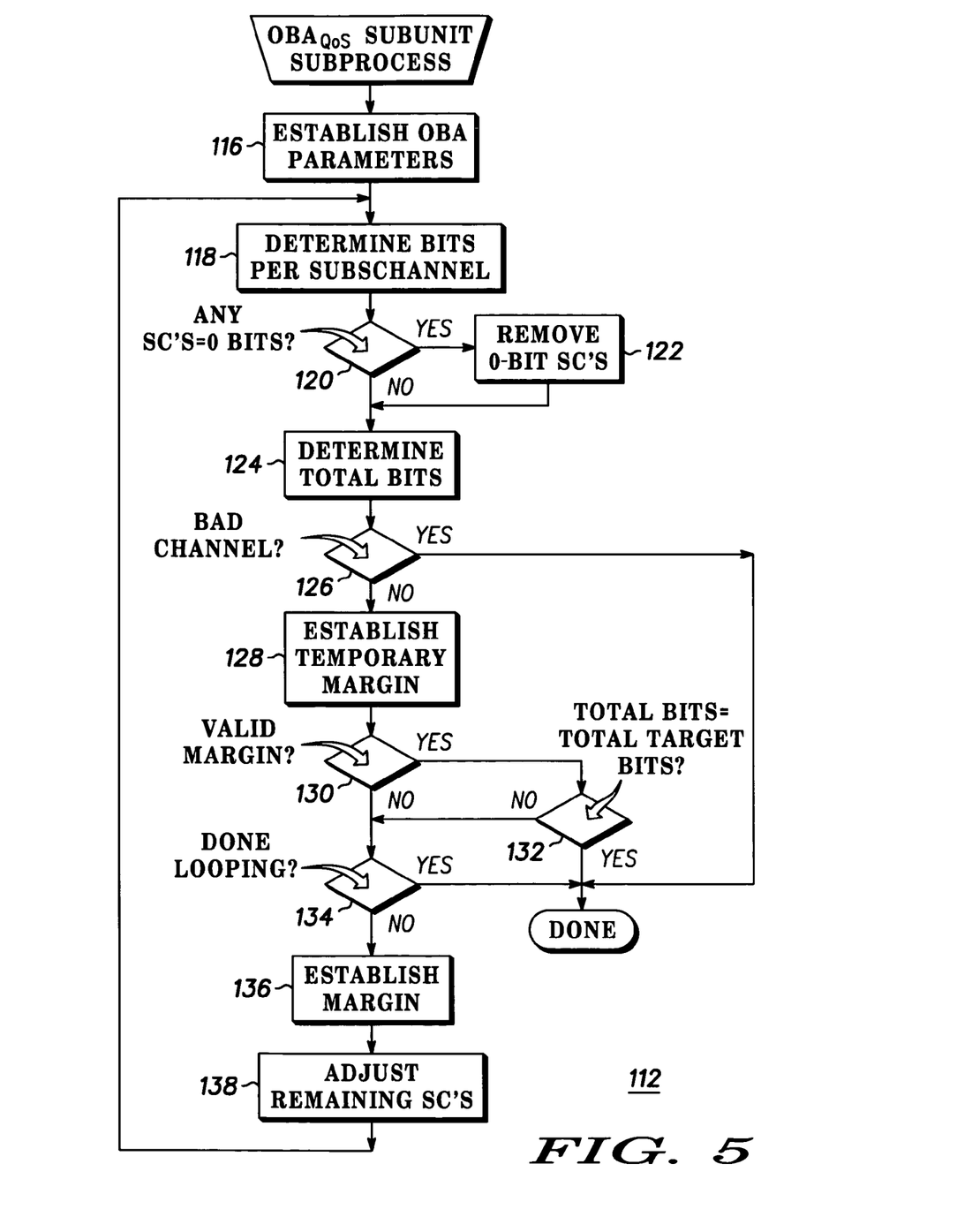
FIG. 5 shows a block diagram depicting an optimal-bit-loading subprocess of the OFDM communication process of FIG. 2 optimized for quality of service in accordance with preferred embodiments of the present invention.
Figure 6:
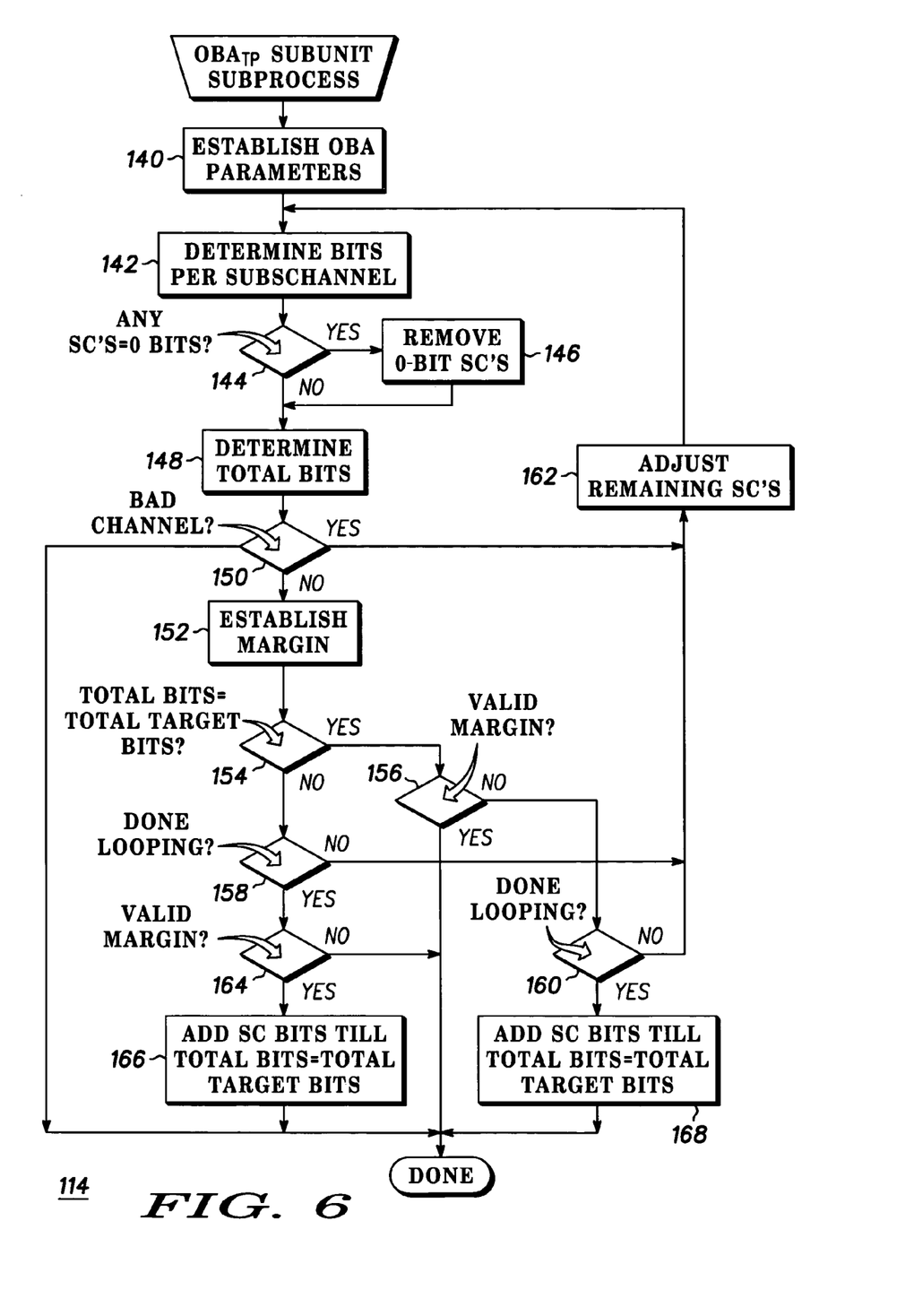
FIG. 6 shows a block diagram depicting an optimal-bit-loading subprocess of the OFDM communication process of FIG. 2 optimized for throughput in accordance with preferred embodiments of the present invention.

Once PDA subroutine 76 has been executed, process 20 continues with an optimal-bit-loading (OBA) subprocess. Such an OBA subprocess, and hence OFDM communication system 22, may be configured to optimize quality-of-service (QoS), e.g., bit error rate (BER), or throughput, e.g., bits/OFDM baud. FIG. 5 shows a block diagram depicting a QoS-optimized OBA subprocess 112 of OFDM communication process 20 in accordance with preferred embodiments of the present invention. FIG. 6, discussed hereinafter, shows a similar block diagram depicting a throughput-optimized OBA subprocess 114. The following discussion refers to FIGS. 1, 2, 3, and 5.

In the preferred embodiment depicted in FIG. 5, subprocess 112 is that portion of process 20 (FIG. 3) executed within OBA subunit 60 (FIG. 1) when system 22 is optimized for QoS. Within subprocess 112, a task 116 establishes initial parameters for the optimal bit-loading algorithm. These initial parameters may include: $SNR_i$, the SNR of each subchannel 30 as determined by PDA subroutine 76 (FIG. 4); $loop_{max}$, a desired maximum number of iterations of an OBA loop; $\gamma_{margin}$, a margin over which a desired QoS is met; and $b_{tar}$, a total power constraint for wideband channel 24. Subprocess 112 then enters the OBA loop.

In a task 118, subprocess 112 determines bits/subchannels b 119 quantized bits/subchannel bq, and fractional bits-per-subchannel difference d for each subchannel 30. This is effected by determining bits/subchannel b 119 from the SNR and $\gamma_{margin}$ in a conventional manner, e.g., $b_i=\log_2(1+[SNR_i/\gamma_{margin}])$. This typically results in non-integral values for bits/subchannel b 119, which is then quantized to produce quantized bits/subchannel qb, e.g., $qb_i=\text{round}_{mod2}(b_i)$. Difference d may then be determined; i.e., $d_i=b_i-qb_i$.

Subprocess 112 then continues with a query task 120 and a task 122, which together determine the number of subchannels 30 to be used $SC_{used}$. Initially, $SC_{used}$ is set equal to number of subchannels N. Query task 120 determines which subchannels 30 contain zero bits, i.e., $b_i=0$. Task 122 then removes all zero-bit subchannels 30 from $SC_{used}$, i.e., for each zero-bit subchannel 30, $SC_{used}=SC_{used}-1$.

A task 124 then determines the total number of bits transmittable in wideband channel 24, i.e., $$b_{total} = \sum_{i=1}^{SC_{used}} bq_i.$$

In a query task 126, subprocess 112 then determines if wideband channel 24 is usable, i.e., if $b_{total}>0$. If $b_{total}=0$, then no bits may be transmitted over wideband channel 24. Wideband channel 24 is therefore bad, OBA subprocess 112 is terminated, and another wideband channel 24 is required.

If query task 126 determines that wideband channel 24 is usable, i.e., $b_{total}>0$, then a task 128 establishes a temporary margin over which a desired QoS is met; e.g., $$\gamma_{temp} = \gamma_{margin} + 10\log_{10}\left(2^{\frac{b_{total}-b_{tar}}{SC_{used}}}\right).$$

A query task 130 then determines if the temporary margin $\gamma_{temp}$ is valid, i.e., $\gamma_{temp}\geq 0$. If query task 130 determines that $\gamma_{temp}$ is valid, then a query task 132 determines if total bits $b_{total}$ is at least total power constraint (target bits) $b_{tar}$, i.e., $b_{total}\geq b_{tar}$.

If query task 132 determines that total bits $b_{total}$ is at least target bits $b_{tar}$, then subprocess 112 has been completed.

If query task 130 determines that the temporary margin $\gamma_{temp}$ is invalid, i.e., $\gamma_{temp}<0$, or if query task 132 determines that total bits $b_{total}$ is less than target bits $b_{tar}$, i.e., $b_{total}<b_{tar}$, then a query task 134 determines if the OBA loop has been completed the desired number of times, i.e., if a current loop iteration $loop_{count}$ is desired maximum loop iteration $loop_{max}$. If query task 134 determines that current iteration $loop_{count}$ is maximum iteration $loop_{max}$, then subprocess 112 has been completed.

If query task 134 determines that current iteration $loop_{count}$ has not yet reached maximum iteration $loop_{max}$, then a task 136 establishes desired QoS margin $\gamma_{margin}$ by subtracting temporary margin $\gamma_{temp}$; i.e., $\gamma_{margin}=\gamma_{margin}-\gamma_{temp}$, and a task 138 sets the used-subchannels number $SC_{used}$ to the number of subchannels 30 remaining. Subprocess 112 then loops back to task 118 to execute another iteration of OBA loop.

It will be appreciated that elements of OBA subprocess 112 well known to one of ordinary skill in the art, e.g., the incrementing of current loop iteration counter loop$_{count}$, have been omitted for simplicity. Those skilled in the art will also appreciate that the description hereinbefore of OBA subprocess 112 pertains to a preferred embodiment of the present invention. The use of variant methods of executing an optimal bit-loading algorithm does not depart from the spirit of the present invention.

FIG. 6 shows a block diagram depicting a throughput-optimized OBA subprocess 114 of OFDM communication process 20 in accordance with preferred embodiments of the present invention. The following discussion refers to FIGS. 1, 2, 3, and 6.

In the preferred embodiment depicted in FIG. 6, subprocess 114 is that portion of process 20 (FIG. 3) executed within OBA subunit 60 (FIG. 1) when system 22 is optimized for throughput. As with QoS-optimized subprocess 112 (FIG. 5) discussed hereinbefore, a task 140 establishes substantially the same initial parameters. Subprocess 114 then enters the OBA loop.

Tasks 142, 144, 146, and 148 determine bits/subchannel b 119, quantized bits/subchannel bq, fractional bits-per-subchannel difference d, number of to-be-used subchannels SC$_{used}$, and total number of transmittable bits b$_{total}$ essentially as described for tasks 118, 120, 122, and 124 hereinbefore.

Query task 150, like task 126, determines if wideband channel 24 is usable. If wideband channel 24 is not usable, OBA subprocess 114 is terminated, and another wideband channel 24 is required.

If query task 150 determines that wideband channel 24 is usable, then a task 152 determine a value for desired-QoS $$\text{margin } \gamma_{margin}, \text{ e.g., } \gamma_{margin} = \gamma_{margin} + 10\log_{10}\left(2^{\frac{b_{total}-b_{tar}}{SC_{used}}}\right).$$

A query task 154 determines if total bits b$_{total}$ is at least target bits b$_{tar}$. If query task 154 determines that total bits b$_{total}$ is at least target bits b$_{tar}$, then a query task 156 determines if margin $\gamma_{margin}$ is valid. If query task 156 determines that $\gamma_{margin}$ is valid, then OBA subprocess 114 is complete.

If query task 154 determines that total bits b$_{total}$ is less than target bits b$_{tar}$, then a query task 158 determines if current loop iteration loop$_{count}$ has reached desired maximum loop iteration loop$_{max}$.

Similarly, if query task 154 determines that temporary margin $\gamma_{margin}$ is invalid, then a task 160 determines if the OBA loop has been completed the desired number of times.

If either query task 158 or query task 160 determines that current iteration loop$_{count}$ has not yet reached maximum iteration loop$_{max}$, then a task 162 adjusts the used-subchannels number SC$_{used}$ to the number of subchannels 30 remaining. Subprocess 114 then loops back to task 142 to execute another iteration of OBA loop.

If task 158 determines that current iteration loop$_{count}$ is maximum iteration loop$_{max}$, then a query task 164 determines if margin $\gamma_{margin}$ is valid. If query task 164 determines that margin $\gamma_{margin}$ is not valid, then subprocess 114 has been completed.

If query task 164 determines that margin $\gamma_{margin}$ is valid, then a task 166 adds bits to quantized bits/subchannel bq$_i$ on subchannels 30 according to largest bit difference d$_i$, adjusts difference d$_i$, and repeats until total bits b$_{total}$ equals target bits b$_{tar}$.

Similarly, if query task 160 determines that current iteration loop$_{count}$ has reached maximum iteration loop$_{max}$, then a task 168 subtracts bits from quantized bits/subchannel bq$_i$ on subchannels 30 according to smallest bit difference d$_i$, adjusts difference d$_i$, and repeats until total bits b$_{total}$ equals target bits b$_{tar}$.

Following tasks 166 and 168, throughput-optimizing subprocess 114 is completed. It will be appreciated that elements of OBA subprocess 114 well known to one of ordinary skill in the art, e.g., the incrementing of current loop iteration counter loop$_{count}$, have been omitted for simplicity. Those skilled in the art will also appreciate that the description hereinbefore of OBA subprocess 114 pertains to a preferred embodiment of the present invention. The use of variant methods of executing an optimal bit-loading algorithm does not depart from the spirit of the present invention.

Those skilled in the art will readily acknowledge that the terms "optimal" and "optimize", as used in this discussion, are relative. All "optimal" algorithms and all "optimization" techniques are subject to round-off errors, quantification, etc. Furthermore, the algorithms and techniques employed may themselves render a less-than theoretical optimum solution. It is recognized that the use of other algorithms and/or techniques may result in a "more optimal" solution (i.e., a "better" optimization). The use of such other techniques and/or increments does not depart from the spirit of the present invention.

The following discussion refers to FIGS. 1, 2, and 3.

OFDM receiver 26 contains a quantization section 170 coupled to OBA subunit 60 within evaluation section 56, and a feedback transmitter section 172 coupled to quantization section 170. Outputs of OBA subunit 60 are fed into quantization section 170. The outputs of OBA subunit 60 are the processed parameters for all subchannels 30, e.g., subchannel designations, SNR, energy levels, etc.

Process 20 proceeds with a task 174 to then transform the parameters into the modulation profile.

The modulation profile is passed from quantization section 170 to feedback transmitter section 172. In a task 176, feedback transmitter section 172 transmits modulation profile to OFDM transmitter 28 via feedback (reverse) channel 32.

OFDM transmitter 28 contains a feedback receiver section 178, a dequantization section 180 coupled to feedback receiver section 178, and an OFDM data transmitter section 182 coupled to dequantization section 180.

In a task 184 of subprocess 48 within transmitting subprocess 48, feedback receiver section 178 receives modulation profile from OFDM receiver 26. Feedback receiver section 178 then passes modulation profile to dequantization section 180.

Within dequantization section 180, a task 186 transforms modulation profile into OFDM data-signal parameters. OFDM data-signal parameters for each subchannel 30, i.e., clear-subchannel parameters (not shown), impeded-subchannel parameters (not shown), and obstructed-subchannel parameters (not shown), are passed to OFDM data transmitter section 182. OFDM data transmitter section 182 may be envisioned as N parallel transmitters each configured to transmit OFDM data 34 for one subchannel 30 (N being the number of subchannels 30), i.e., clear subchannels 93 plus impeded subchannels 95 plus obstructed subchannels 111.

Within OFDM data transmitter section 182, a task 194 routes OFDM data 34 to each subchannel 30 in the plurality of subchannels 30 within wideband channel 24.

A task 196 then modulates OFDM data 34 in each subchannel 30 in response to the SNR and other parameters of that subchannel 30. A task 198 then transmits modulated OFDM data 34 to OFDM receiver 26. OFDM transmitter 28 has transmitted OFDM data 34 in response to either the QoS (e.g., bit error rate) or throughput (e.g., bits/OFDM baud) of each usable subchannel 30 (i.e., clear and impeded subchannels 93 and 95).

Those skilled in the art will appreciate that, since obstructed subchannels 111 call for a transmission of zero energy, OFDM transmitter 28 does not actually transmit on obstructed subchannels 111.

OFDM receiver 26 routes received OFDM data 34 to OFDM data receiver section 36. OFDM data receiver section 36 is coupled to quantization section 170. Within OFDM data receiver section 36, a task 200 receives OFDM data 34 from OFDM transmitter 28 and modulation profile from quantization section 170. Since a type of water-pouring routine was used in the determination of OFDM data-signal levels, each clear subchannel 93 receives OFDM data 34 at maximum subchannel signal level 40, each impeded subchannel 95 receives OFDM data 34 at an intermediate subchannel signal level 42, and each obstructed subchannel 111 receives OFDM data 34 at zero subchannel signal level 44 (i.e., does not receive OFDM data 34).

A task 202 then demodulates OFDM data 34 in response to modulation profile. OFDM data 34 demodulated by task 202 may then be decoded by task 204 to produce the desired results.

Those skilled in the art will appreciate that, in some embodiments, portions of OFDM data 34 demodulated by task 202 may be fed back to transmit OFDM data subprocess 48 to better control modulation and transmission. This is performed as a feedback signal 206 utilizing conventional techniques. It may also be appreciated that SNR data 208 may be fed forward in OFDM receiver 26 from determine SNR process 74 to decode OFDM data process 204. Such data 208 may then be used to more ably decode OFDM data 34. The use of these and/or other enhancements and refinement techniques does not depart from the spirit of the present invention.

Those skilled in the art will appreciate that since wideband channel 24 is dynamic, subprocesses 46 and 48 may be iterated to track changes in the SNR in each subchannel 30 of the plurality of subchannels 30 within wideband channel 24.

In the preferred embodiment of FIGS. 1 and 2, wideband channel 24 supports eighteen user channels 210, each 100-bits wide. Since bits/subchannel 119 varies among subchannels 30, the number of subchannels 30 per 100-bit user channel 210 also varies. That is, OFDM transmitter 28 transmits OFDM data 34 over at least one user channel 210, wherein that user channel 210 is formed of at least one subchannel 30. Those skilled in the art will appreciate that this discussion is exemplary only, that a plurality of user channels 210 would normally be used, that each user channel 210 would normally be formed of a plurality of subchannels 30. As depicted in FIG. 2, user channels 210 of OFDM system 22 are not coincident with subchannels 30. Any desired configuration of user channels 210 may be used without departing from the spirit of the present invention.

In summary, the present invention teaches a method of OFDM communication within a wideband channel 24 having a noncontiguous spectrum and system 22 therefor. The method and system 22 provided produces efficient OFDM communication over dynamic wideband channel 24. The method and system desirably optimize efficiency by utilizing each subchannel 30 within the wideband channel 24 to its fullest. Those subchannels 30 found to have substantially no noise and/or interference (clear subchannels 93) are fully utilized. Those subchannels 30 found to have excessive noise and/or interference (obstructed subchannels 111) are excluded. Those subchannels 30 found to have some but not excessive noise and/or interference are partially utilized to the maximum extent possible. The method provided increases the efficiency of system 22 by optimizing the quality of signal and/or the throughput of the OFDM data 34.

Throughout this discussion, an orthogonal frequency-division multiplex (OFDM) communication process 20 (see FIG. 3) is presumed. The preferred embodiment of process 20 is exemplified for use with a wireless OFDM communication system 22 (see FIG. 1) utilizing a wideband channel 24 (see FIG. 2) having a dynamic spectrum. Those skilled in the art will appreciate that process 20 may be varied to allow application to other wireless and/or wireline multiple-carrier communication systems not having flat and/or contiguous frequency response over a wideband RF communication channel, e.g., wireline systems utilizing discrete multitone (DMT) modulation techniques for asynchronous digital subscriber line (ADSL) communications, without departing from the spirit of the present invention.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of orthogonal frequency-division multiplex (OFDM) communication via a plurality of subchannels within a noncontiguous wideband channel, said method comprising:
  receiving a reference signal transmitted over each subchannel in said plurality of subchannels within said wideband channel;
  producing a modulation profile of said wideband channel, wherein said modulation profile is responsive to a signal-to-noise ratio (SNR) for each subchannel in said plurality of subchannels within said wideband channel, wherein said producing activity comprises
    establishing a least-SNR requirement,
    determining said SNR for each of said subchannels in said plurality of subchannels within said wideband channel, and
    designating each of said subchannels having an SNR greater than said least-SNR requirement as a clear subchannel; and
  transmitting OFDM data in response to said modulation profile.

2. An OFDM communication method as claimed in claim 1 wherein said producing activity additionally comprises:
  establishing a least-quality-of-service requirement; and
  optimizing a throughput of each of said clear subchannels in which a quality-of-service is greater than said least-quality-of-service requirement.

3. An OFDM communication method as claimed in claim 1 wherein said producing activity additionally comprises:
  establishing a least-throughput requirement; and
  optimizing a quality-of-service of each of said clear subchannels in which a throughput is greater than said least-throughput requirement.

4. An OFDM communication method as claimed in claim 1 additionally comprising iterating said producing and transmitting activities to track changes in said SNR in each subchannel of said plurality of subchannels within said wideband channel.

5. An OFDM communication method as claimed in claim 1 wherein said producing activity comprises:
  scanning said wideband channel; and determining said SNR for each of said subchannels in said plurality of subchannels within said wideband channel in response to said scanning activity.

6. A method of orthogonal frequency-division multiplex (OFDM) communication via a plurality of subchannels within a noncontiguous wideband channel, said method comprising:
producing a modulation profile of said wideband channel, wherein said modulation profile is responsive to a signal-to-noise ratio (SNR) for each subchannel in said plurality of subchannels within said wideband channel including establishing a least-SNR requirement,
determining said SNR for each of said subchannels in said plurality of subchannels within said wideband channel,
designating each of said subchannels having an SNR greater than said least-SNR requirement as a clear subchannel,
sorting said subchannels by said SNRs therein,
adjusting said least-SNR requirement,
determining said SNR for each of said subchannels in said plurality of subchannels within said wideband channel, and
designating each of said subchannels having an SNR greater than said adjusted least-SNR requirement as an impeded subchannel; and
transmitting OFDM data in response to said modulation profile.

7. An OFDM communication method as claimed in claim 6 wherein said producing activity additionally comprises:
determining a noise level for each of said clear and impeded subchannels; and
determining an OFDM data-signal level for each of said clear and impeded subchannels, wherein a subchannel energy level is substantially equal to said OFDM data-signal level for each of said clear subchannels, and said subchannel energy level is substantially equal to a sum of said OFDM data-signal level plus said noise level for each of said impeded subchannels.

8. A method of orthogonal frequency-division multiplex (OFDM) communication via a plurality of subchannels within a noncontiguous wideband channel, said method comprising:
producing a modulation profile of said wideband channel, wherein said modulation profile is responsive to a signal-to-noise ratio (SNR) for each subchannel in said plurality of subchannels within said wideband channel including
scanning said wideband channel, and
determining said SNR for each of said subchannels in said plurality of subchannels within said wideband channel in response to said scanning activity, comprising ascertaining usable ones of said subchannels in response to said SNR of each of said subchannels, and estimating a bit error rate for each of said usable subchannels; and
transmitting OFDM data in response to said modulation profile.

9. An OFDM communication method as claimed in claim 8 wherein said transmitting activity transmits said OFDM data signal in response to said bit error rate of each of said usable subchannels.

10. A method of orthogonal frequency-division multiplex (OFDM) communication via a plurality of subchannels within a noncontiguous wideband channel, said method comprising:
producing a modulation profile of said wideband channel, wherein said modulation profile is responsive to a signal-to-noise ratio (SNR) for each subchannel in said plurality of subchannels within said wideband channel including
scanning said wideband channel, and
determining said SNR for each of said subchannels in said plurality of subchannels within said wideband channel in response to said scanning activity, comprising ascertaining usable ones of said subchannels in response to said SNR of each of said subchannels, and estimating a throughput for each of said usable subchannels; and
transmitting OFDM data in response to said modulation profile.

11. A method of orthogonal frequency-division multiplex (OFDM) communication via a plurality of subchannels within a noncontiguous wideband channel, said method comprising:
producing a modulation profile of said wideband channel, wherein said modulation profile is responsive to a signal-to-noise ratio (SNR) for each subchannel in said plurality of subchannels within said wideband channel; and
transmitting OFDM data in response to said modulation profile; and
wherein said transmitting activity transmits said OFDM data over the plurality of subchannels, from which more than one user channel is formed and concurrently supported.

12. An OFDM communication method as claimed in claim 11 wherein each of said user channels comprises at least one of said subchannels.

13. An OFDM communication method as claimed in claim 12 wherein:
said producing activity additionally comprises designating each of said subchannels having said SNR less than said least-SNR threshold and greater than an SNR-evaluation threshold as an impeded subchannel; and
said transmitting activity transmits said OFDM data so that each of said impeded subchannels receives said OFDM data at said intermediate subchannel signal level.

14. An OFDM communication method as claimed in claim 13 wherein:
said producing activity comprises determining a signal-to-noise ratio (SNR) for each of said subchannels in said plurality of subchannels within said wideband channel;
said producing activity additionally comprises designating each of said subchannels having said SNR greater than a least-SNR requirement as clear subchannel; and
said transmitting activity transmits said OFDM data so that each of said clear subchannels receives said OFDM data at said maximum subchannel signal level.

15. An OFDM communication method as claimed in claim 14 wherein, said least-SNR requirement is a first least-SNR requirement, and wherein:
said producing activity additionally comprises adjusting said least-SNR requirement to produce a second least-SNR requirement;
said producing activity additionally comprises designating each of said subchannels having said SNR less than said first least-SNR requirement and greater than said second least-SNR requirement as an impeded subchannel; and
said transmitting activity transmits said OFDM data so that each of said impeded subchannels receives said OFDM data at said intermediate subchannel signal level.

16. An OFDM communication method as claimed in claim 15 wherein:
said producing activity additionally comprises designating each of said subchannels not designated as one of said clear subchannel and said impeded subchannel as an obstructed subchannel; and said transmitting activity transmits said OFDM data so that each of said obstructed subchannels receives said OFDM data at said zero subchannel signal level.

17. An OFDM communication method as claimed in claim 13 wherein said producing activity comprises:
   determining a signal-to-noise ratio (SNR) for each of said subchannels in said plurality of subchannels within said wideband channel;
   designating each of said subchannels having said SNR greater than a first least-SNR requirement as a clear subchannel;
   designating each of said subchannels having said SNR less than said first least-SNR requirement and greater than a second least-SNR requirement as an impeded subchannel;
   determining a noise level in response to said SNR for each of said clear and impeded subchannels; and
   deducing an OFDM data-signal level for each of said clear and impeded subchannels, wherein a subchannel signal level is a sum of said OFDM data-signal level plus said noise level for each of said clear and impeded subchannels, and wherein said subchannel signal levels for each of said clear and impeded subchannels are substantially equal.

18. An OFDM communication method as claimed in claim 17 wherein said producing activity additionally comprises:
   establishing a least-quality-of-service requirement for each of said clear and impeded subchannels; and
   optimizing a throughput of each of said clear and impeded subchannels in which a quality-of-service is greater than said least-quality-of-service requirement.

19. An OFDM communication method as claimed in claim 17 wherein said producing activity additionally comprises:
   establishing a least-throughput requirement for each of said clear and impeded subchannels; and
   optimizing a quality-of-service of each of said clear and impeded subchannels in which a throughput is greater than said least-throughput requirement.

20. An OFDM communication method as claimed in claim 13 additionally comprising iterating said producing and transmitting activities.

21. An orthogonal frequency-division multiplex (OFDM) communication system utilizing a plurality of subchannels within a noncontiguous wideband channel, said system comprising:
   an OFDM receiver configured to obtain a signal-to-noise ratio (SNR) for each subchannel in said plurality of subchannels within said wideband channel, wherein said OFDM receiver comprises
      a scanning section configured to scan each of said subchannels in said plurality of subchannels within said wideband channel,
      a detection section coupled to said scanning section and configured to obtain said SNR for each of said subchannels, and
      an evaluation section coupled to said detection section and configured to designate as a clear subchannel each of said subchannels having a SNR greater than a least-SNR requirement; and
   an OFDM transmitter in communication with said OFDM receiver and configured to transmit OFDM data so that said OFDM receiver receives said OFDM data in each subchannel within said plurality of subchannels within said wideband channel at one of a zero subchannel signal level, a predefined maximum subchannel signal level which is greater than the zero subchannel signal level, and a predefined intermediate subchannel signal level which is greater than the zero subchannel signal level and less than the maximum subchannel signal level, in response to said SNR therein.

22. An OFDM communication system as claimed in claim 21 wherein said OFDM transmitter is configured to transmit said OFDM data so that said OFDM receiver receives said OFDM data in each of said clear subchannels at said maximum subchannel signal level.

23. An OFDM communication system as claimed in claim 21 wherein:
   said least-SNR requirement is a first least-SNR requirement;
   said evaluation section is additionally configured to designate as an impeded subchannel each of said subchannels having a SNR less than said first least-SNR threshold and greater than a second least-SNR requirement.

24. An OFDM communication system as claimed in claim 23 wherein said OFDM transmitter is configured to transmit said OFDM data so that said OFDM receiver receives said OFDM data in each of said impeded subchannels at said intermediate subchannel signal level.

25. An OFDM communication system as claimed in claim 24 wherein:
   said intermediate subchannel signal level is one of a plurality of intermediate subchannel signal levels; and
   said OFDM transmitter is configured to transmit said OFDM data so that said OFDM receiver receives said OFDM data in each of said impeded subchannels at one of said plurality of intermediate subchannel signal levels in response to said SNR thereof.

26. An OFDM communication system as claimed in claim 23 wherein said evaluation section is additionally configured to designate as an obstructed subchannel each of said subchannels not designated as one of said clear subchannels and said impeded subchannels.

27. An OFDM communication system as claimed in claim 26 wherein said OFDM transmitter is configured to transmit said OFDM data so that said OFDM receiver receives said OFDM data in each of said obstructed subchannels at said zero subchannel signal level.

28. A method of orthogonal frequency-division multiplex (OFDM) communication via a plurality of subchannels within a noncontiguous wideband channel, said method comprising:
   determining a signal-to-noise ratio (SNR) for each of said subchannels in said plurality of subchannels within said wideband channel;
   designating as a clear subchannel each of said subchannels in which said SNR is greater than or equal to a first least-SNR requirement;
   designating as an impeded subchannel each of said subchannels in which said SNR is less than said first least-SNR threshold and greater than or equal to a second least-SNR requirement;
   designating as an obstructed subchannel each of said subchannels not designated as one of said clear subchannels and said impeded subchannels; and
   transmitting OFDM data so that each of said clear subchannels receives said OFDM data at a maximum subchannel signal level, each of said impeded subchannels receives said OFDM data at an intermediate subchannel signal level, and each of said obstructed subchannels receives said OFDM data at zero subchannel signal level.

* * * * *